(12) United States Patent
Beck

(10) Patent No.: US 6,584,390 B2
(45) Date of Patent: Jun. 24, 2003

(54) SYSTEM FOR MEASURING THE AMOUNT OF CROP TO BE HARVESTED

(75) Inventor: Folker Beck, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/151,654

(22) Filed: May 20, 2002

(65) Prior Publication Data

US 2003/0004630 A1 Jan. 2, 2003

(30) Foreign Application Priority Data

Jun. 28, 2001 (DE) ......................... 101 30 665

(51) Int. Cl.[7] ................................................ G06G 7/76
(52) U.S. Cl. ............................ 701/50; 172/4.5; 172/9; 56/10.2 C; 56/10.2 D; 56/10.2 R
(58) Field of Search ..................... 701/1, 50; 172/4.5, 172/5, 6, 9; 56/10.2 C, 10.2 D, 10.2 F, 10.2 R

(56) References Cited

U.S. PATENT DOCUMENTS 4,077,488 A * 3/1978 Bennett et al. ............. 180/169
4,228,636 A    10/1980 Homburg .................... 56/10.2
5,920,018 A *  7/1999 Wilkerson et al. ........ 73/861.41
6,095,254 A    8/2000 Homburg ...................... 172/6
6,101,795 A    8/2000 Dickhans .................... 56/10.2
6,128,574 A    10/2000 Diekhans .................... 701/209
6,389,785 B1 * 5/2002 Diekhans et al. ......... 56/10.2 F
6,389,884 B1 * 5/2002 Diekhans et al. ............. 73/73

FOREIGN PATENT DOCUMENTS

EP    0 821 296 A2    1/1998
EP    0 887 660 A2    12/1998

* cited by examiner

Primary Examiner—Gertrude Arthur

(57) ABSTRACT

A system for measuring the amount of crop material located on a field to be harvested uses a scanning laser device. The scanning laser device has a transmitter for emitting electromagnetic radiation, a receiver for receiving reflected radiation from the crop material and providing resolution in terms of location and/or angle from which the reflected radiation was received. The receiver also generates an intensity signal indicating the intensity of the reflected electromagnetic radiation. A controller is in communication with the scanning laser device and determines the amount of the crop material located on the field on the basis of the crop material location signals and the intensity signals received from the receiver.

20 Claims, 3 Drawing Sheets

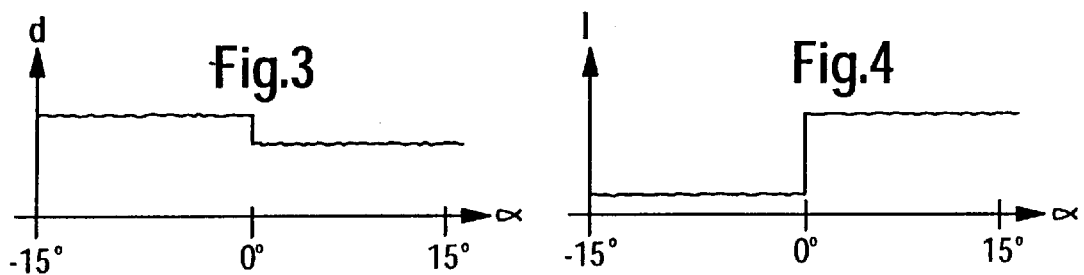
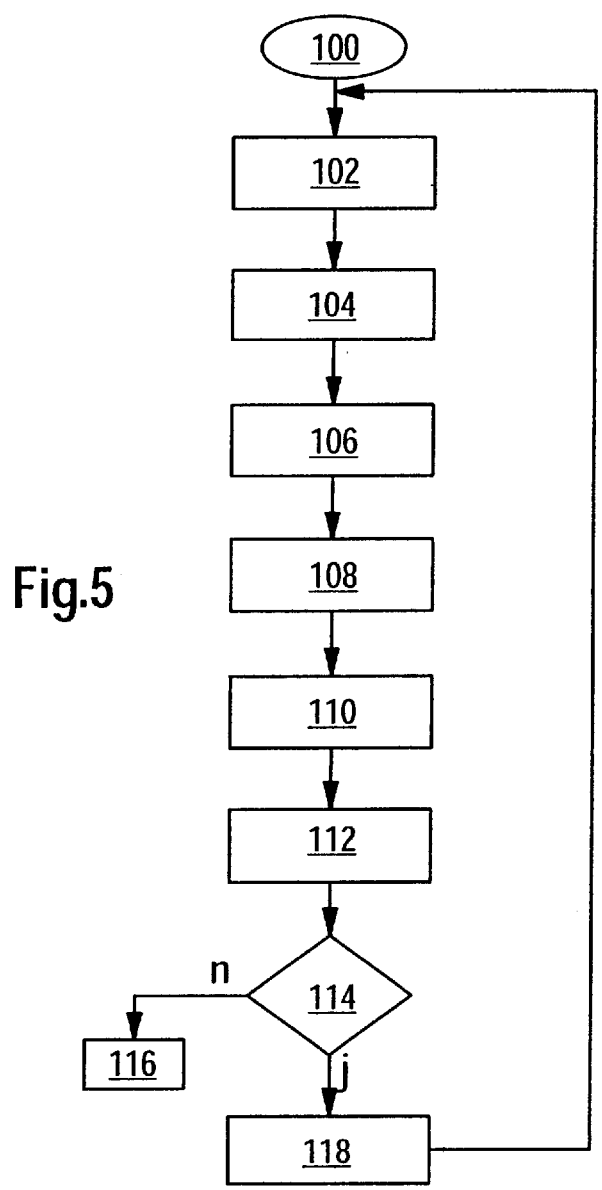

SYSTEM FOR MEASURING THE AMOUNT OF CROP TO BE HARVESTED

FIELD OF THE INVENTION

The present invention is directed to a system for measuring the amount of crop material to be harvested by a harvesting machine. A scanning transmitter and receiver of electromagnetic radiation identifies the location and intensity of electromagnetic radiation reflected from the crop material located on a field and communicates that information to a controller that determines the amount of crop material to be harvested.

BACKGROUND OF THE INVENTION

Crop throughput sensors measuring the amount of crop processed by a harvesting machine are used to automatically control crop conveying and/or crop processing assemblies. Crop throughput is also frequently used for measuring the harvest in specific areas or sub-areas. The forward velocity of the harvesting machine can be controlled by a control arrangement in response to the measured crop throughput, such that a desired crop throughput is maintained corresponding to the optimum throughput of the harvesting machine. It is known to locate crop throughput sensors on a harvesting machine. In known systems, crop throughput measurements are performed after the crop has been harvested by the harvesting assembly of the harvesting machine. Because of the time delay between sensing crop throughput and its location in the harvesting machine, sudden changes in the crop throughput cannot be compensated by a corresponding change in forward velocity. As such, crop processing arrangements may become overloaded, underloaded, or jammed.

U.S. Pat. No. 4,228,636 proposes identifying the density of a standing crop on a field by using ultrasonic sensors mounted on a harvesting assembly. The sensors are arranged to sense standing crop located immediately in front of the cutter bar. A transmitter arranged on the side of the crop intake arrangement emits ultrasonic radiation that is propagated over the width of the crop intake arrangement. The loss of intensity of the ultra-sonic radiation as well as their propagation time detected by the receiver located opposite the transmitter and caused by the crop stand is evaluated and converted into a control signal. Due to external disturbance effects and error possibilities, ultra-sonic sensors have not been proven worthwhile in practical applications.

EP 0 887 660 A describes a harvesting machine that is equipped with a laser distance measuring arrangement. The laser distance measuring arrangement is located on the operator's cab and continuously scans a region located several meters ahead of the harvesting machine. The cross section of a windrow of crop material to be harvested by the pickup platform is evaluated on the basis of the profile of the windrow located in front of the harvesting machine. The edge of the windrow is identified on the basis of a sudden contour variation. The height of the windrow is determined on the basis of the measured distance values. Here the disadvantage is the fact that only the outer contours of the windrow are considered. A relatively dense windrow cannot be distinguished from a relatively sparse windrow with the same height.

U.S. Pat. No. 6,095,254 is directed to an agricultural machine with a boundary edge detection system. A laser sensor scans a region located ahead of the agricultural machine to detect and monitor the boundary edge. The boundary of the operation is recognized on the basis of the propagation time and the intensity or the phase shift of the reflected light. The arrangement described is not appropriate for the measurement of the amount of crop material to be harvested.

SUMMARY OF THE INVENTION

It is an object of the present invention to provide an improved system to measure the amount of crop material to be harvested prior to the crop material being taken up by the harvesting assembly of the harvesting machine.

The crop material to be harvested is exposed to electromagnetic radiation from a scanning device (particularly laser radiation). A receiver in the scanning device detects the electromagnetic radiation reflected by the crop material to resolve its location or its angle. In addition, the receiver measures the intensity of the reflected electromagnetic radiation. The receiver is in communication with a controller. The controller calculates the amount of crop material to be harvested based on the location and/or angle signal, and the intensity signal.

The receiver produces an at least one-dimensional signal resolved by location or angle. A two-dimensional signal taken by a camera is also conceivable. Here the transmitter and the receiver can be moved or pivoted in a manner known in itself together step-by-step or continuously over a measurement region, or only one of these. The controller has been provided with information as to which location or angle is to be associated with the signal received by the receiver. The use of a row of transmitters and/or receivers arranged alongside each other is also conceivable. There is also the possibility that a laser distance measurement sensor can be used in which the transmitter and/or the receiver is not rotated, but a mirror rotating continuously or step-by-step is used to scan the visible region. An angular region of up to 180° can be scanned. Such sensors are available from the Sick A. G., D-72796 Reute, under the designation LMS.

The invention proposes that the receiver detect the intensity or the amplitude of the reflected radiation that is a function of the number of plants per unit area and the dimensions of the plants. The measured intensity is considered in the determination of the amount of crop material to be harvested.

From the location and/or angle signals and the intensity signals the amount of crop material to be harvested can be calculated. The amount of crop material to be harvested can be defined as the volume of plants standing on a unit area. Thereby the amount can be measured in cubic meters of plant volume per square meter of the field, although other measurement units are also conceivable. It does not matter if the amount is calculated explicitly and transmitted in any particular form, used as an intermediate result in a further calculation or is incorporated in a calculation of the magnitude of an amount depending directly or indirectly on the amount. In this way with a known width of a harvesting assembly and a known forward velocity an expected crop throughput can be determined from the signals of the receiver.

Using this system an exact determination of the amount of crop material to be harvested can be calculated. Based on the known width of the harvesting assembly and the forward velocity of the harvesting machine the predicted crop load on the harvesting machine can be determined. This predicted crop load can be compared with an optimal crop load, and the forward speed of the machine adjusted accordingly to follow the optimal crop load. The predicted crop load measurement is performed at a distance ahead of the harvesting machine, so that in case of a variation in crop density the forward velocity can be adjusted in a timely manner. This increases the comfort of the operation and avoids critical situations in which the machine tends to jam. The conveying and separating processes in a harvesting machine can also be made to conform to the throughput amounts that can be expected in a timely manner, so that the resulting harvest is improved. Particular attention must be paid to the avoidance of jams that result from excessively high crop throughput.

As a rule the receiver is arranged to determine the distance to a point from the receiver and/or the transmitter to which the immediate output signal of the receiver is to conform. By scanning or sampling of a region located ahead of the harvesting machine a profile of the crop material to be harvested can be determined. In the controller, information can be generated about the width and/or the height of the stand of the plants that makes possible a precise determination of the amount.

The moisture of the plants can also be detected by a known moisture sensor, the output of which is communicated to the controller. The sensor can be arranged in the harvesting machine and detect the moisture of plants already harvested. The use of a sensor operating without contact, that operates, for example, with infra-red radiation, in order to detect the moisture of the plants before the harvesting process, is also conceivable. The moisture contains information about the density of the stand of the plants, that is, its mass per unit volume. On the basis of the measured values of the amount and the moisture, the mass density of the plants can be determined thereby (in units of plant mass per unit of area). If the width of the crop intake arrangement and the forward propulsion velocity are known, the mass throughput that is to be expected can be determined.

Dust in the air and on the plants are disturbance magnitudes whose effect can be largely eliminated by comparing the amount of crop material measured by the scanning device with crop throughput values calculated by sensors located on the harvesting machine. Therefore it is preferred that the controller be connected with an additional crop throughput sensor that measures the crop throughput in the harvesting machine. Crop throughput sensors have been proposed that measure the drive torque or the slip at the threshing cylinder or at the straw chopper. Position sensors on the feeder house, sheet metal baffle plates in the grain elevator, microwave sensors in the flow region of the crop, or sensors measuring the spacing between the pre-compression rolls may also be used to measure crop throughput.

The crop throughput values derived from the measurement values of the scanning device and the throughput values measured by the crop throughput sensor can be compared. In case of a deviation between the measured values for the crop throughput an error message can be transmitted that can instruct the operator to clean the transmitter and/or the receiver.

The crop that corresponds to the signal measured by the receiver interacts as a rule with the crop throughput sensor in the harvesting machine only after a time delay. It is appropriate therefore to consider the time delay between the two measurements in the controller.

It is also conceivable that the measurement value of the crop throughput sensor be used for calibrating the magnitude of the value calculated from the scanning device. Calibration is possible in which the mathematical connection is determined, for example, in the form of a correction table or curve between the magnitude determined from the measured values of the receiver and the measured value of the crop throughput sensor. Here the connection can be determined completely anew after a certain time interval so as to correspond to the immediate conditions (for example, optical qualities of the plants conditioned by weather conditions, time of day, moisture, type of plant, type of ground and ground condition, etc. as well as condition of the scanning device). In addition, with sufficient data, an expert system can be used to calibrate the scanning device. The controller can also be provided with information about the type of crop material to be harvested. The value of the amount generated from the signals of the scanning device is recalculated on the basis of a correction value determined by the data. In the measurement and/or the calibration according to the process described the height of cut of the cutting head can also be considered which can be measured by sensors on the cutting head itself or by the angle of the feeder house. The height of cut influences the amount of the straw taken up, but does not affect the amount of grain. If crop throughput sensors are used which measure only the grain throughput, this correction is worth considering.

As explained above, the controller is able to recognize boundaries of the crop material to be harvested. Accordingly it can be connected with a steering arrangement and guide a harvesting machine automatically along the edge of the crop material to be harvested.

Furthermore, the amount values provided by the controller can be used as input for the forward propulsion velocity of a harvesting machine. They can also be used to control the velocity of a crop conveying arrangement (for example, that of a feeder house) and parameters of crop processing arrangements (for example, the gap of a thresher cylinder and/or the rotational speed of the threshing cylinder). The amount values can also be referenced against their location in a field to generate a crop map.

The present invention can be used on agricultural combines or forage harvesters.

BRIEF DESCRIPTION OF THE DRAWINGS

FIG. 3 shows a diagram that schematically reproduces the distances measured by a receiver.

FIG. 4 shows a diagram that schematically reproduces the intensities measured by a receiver.

FIG. 5 shows a flow chart on how the present invention operates.

DETAILED DESCRIPTION

Figure 1:
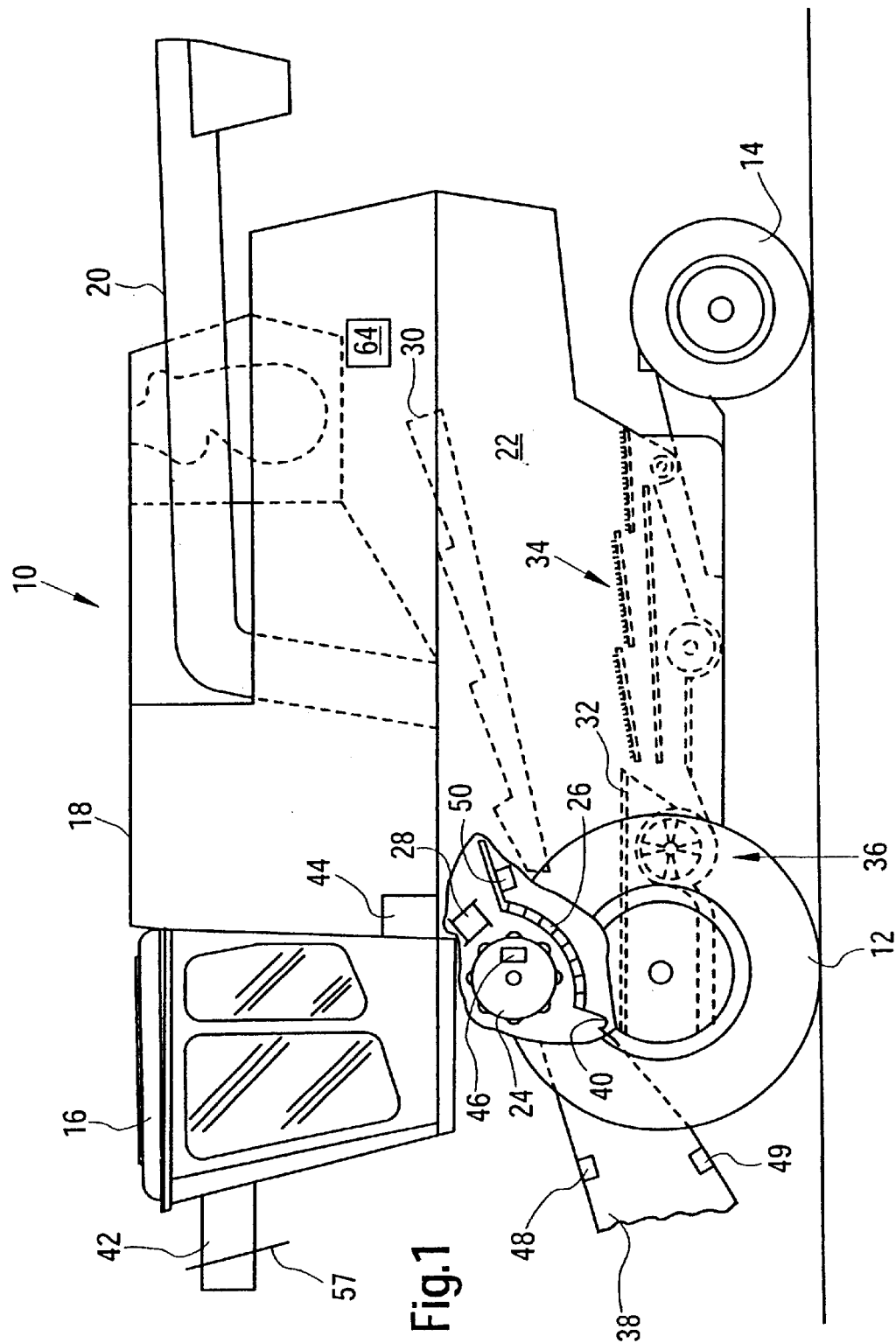
FIG. 1 shows a side view of a harvesting machine having the present invention.

A harvesting machine 10 shown in FIG. 1 is a combine that is supported on front driven and rear steerable wheels 12 and 14 respectively. The harvesting machine is provided with an operator's cab 16 from which it can be controlled by an operator. A grain tank 18 is located behind the operator's cab 16. A discharge auger 20 is used to remove grain from the grain tank 18 and direct it to a receiving truck or grain cart. The grain tank 18 and operator's cab 16 are supported on a frame 22 formed by sidesheets. A harvesting assembly, not shown, directs harvested crop material to a feeder house 38. The feeder house 38 is an upwardly inclined conveyor for directing the harvested crop material past stone trap 40 to the crop processing assemblies located between the sidesheets of the frame 22. The harvested crop material from the feeder house 38 first encounters the threshing assembly formed by a transverse threshing cylinder 24 associated concave 26 and beater 28. The threshing assembly threshes the harvested crop by separating the small crop components from the large crop components. The threshed crop mat is loosened by the separation assembly formed by straw walkers 30. The straw walkers 30 expand the threshed crop material mat so that small components trapped in the mat can fall downwardly to the grain pan 32. The grain pan 32 takes the small components from the threshing assembly and the separating assembly and direct these components to a cleaning assembly. The cleaning assembly comprises a cleaning shoe having sieves 34 over which the small components pass and a cleaning fan 36 that directs an air blast through the cleaning shoe. The light portions (chaff) of the small components is blown out the rear of the combine, whereas the heavier small components (clean grain) falls through the sieves 34 and is directed by augers and an elevator to the grain tank 18.

Although the present invention is being illustrated on a conventional combine it may also be applied to rotary combines and other harvesting machines having different configurations.

The front of the operator's cab 16 is provided with a scanning laser device 42 that is in communication with a controller 44. The controller 44 is also in communication with a crop throughput sensor 48 arranged in the feeder house 38. The crop throughput sensor 48 measures the thickness harvested crop mat passing through the feeder house 38. A velocity sensor 49 detects the conveying velocity of the feeder house 38 and is in communication with the controller 44. A moisture sensor 50 is located downstream from the threshing cylinder 24. The moisture sensor 50 is also in communication with the controller 44 and uses infra-red radiation to measure the moisture content of the threshed crop material. The controller 44 is also in communication with a drive 46 for rotating the threshing cylinder 24 and a variable speed transmission 64 for propelling the vehicle. For example the variable speed transmission could comprise a hydrostatic transmission, wherein a swash plate of a hydraulic pump that is connected with a hydraulic motor controls the forward propulsion velocity of the harvesting machine 10.

Figure 2:
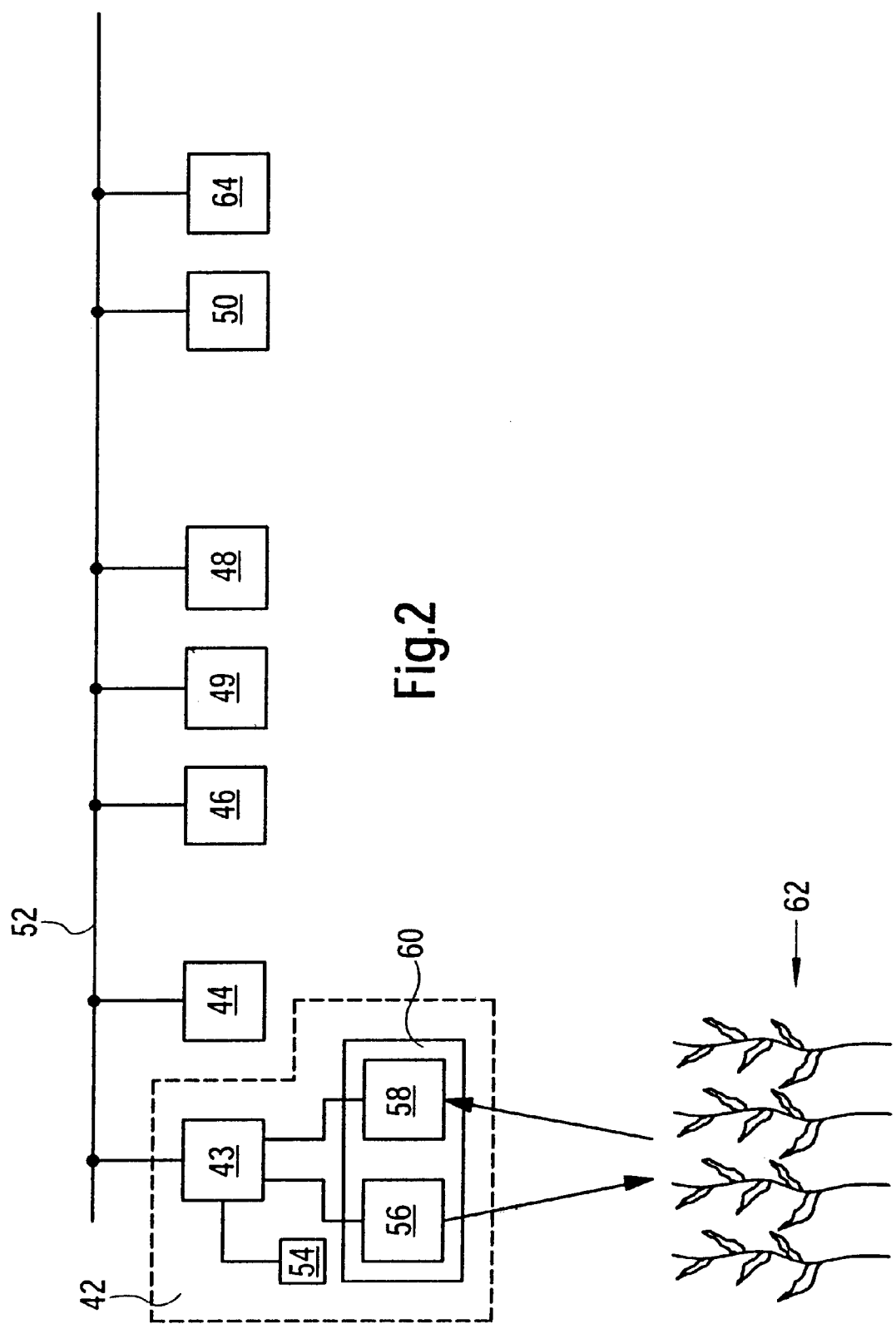
FIG. 2 shows a block diagram of the present invention.

As can be seen in FIG. 2, the scanning laser device 42, the controller 44, the drive 46, the crop throughput sensor 48, the velocity sensor 49, the moisture sensor 50 and the variable speed transmission 64 are connected by a bus 52. The bus 52 may be a CAN bus or an LBS bus.

The scanning laser device 42 includes a control arrangement 43, that is connected with a transmitter 56, a receiver 58 and a pivoting motor 54. The transmitter 56 and the receiver 58 are mounted on a pivoting table 60, that can be pivoted back and forth by the pivoting motor 54 about an axis 57 thereby scanning an arc located in front of the harvesting machine 10. The electromagnetic (light) radiation radiated by the transmitter 56 may lie in the visible range or above or below the visible range. The transmitted electromagnetic radiation is directed to the ground several meters (for example, 10 meters) in front of the harvesting assembly in the direction of operation of the harvesting machine 10. The receiver 58 detects the reflected radiation radiated by the transmitter 56 that is reflected from the ground, standing plants 62 or other objects. Since the radiation radiated from the transmitter 56 is amplitude modulated, the measurement of the propagation time can be used to detect the distance between the scanning laser device 42 and the point at which the radiation was reflected. The receiver 58 provides an output signal that contains information about the intensity (amplitude) of the reflected radiation in addition to the propagation time. The pivoting motor 54 is a stepper motor and pivots the pivoting table 60 continuously back and forth through an arc, for example, 30° degrees about the axis 57. The control arrangement 43 is arranged for each pivot angle of the pivoting table 60 to detect the immediate angle, the distance from the point of reflection and the intensity of the radiation received by the receiver 58. Following this the pivoting motor 54 is activated and the pivoting table 60 brought into another position. The control arrangement 43 has been provided with information about the immediate angle of the pivoting table 60 since it controls the pivoting motor 54. A separate sensor would also be conceivable for the detection of the pivoting angle, in which case the stepper motor can be replaced by any desired motor. The pivoting table could be replaced with a rotating mirror.

FIGS. 3 and 4 reproduce examples of measurement values for the receiver 58. At negative angles, that is, in the detection region located to the left of the direction of operation of the scanning laser device 42, the measured distance "d" shown in FIG. 3 on the y axis is constant and relatively large and drops from an angle of approximately 0° (forward direction of operation at the longitudinal centerline of the harvesting machine) in one step to another constant but lower value. The measured intensity I shown in FIG. 4 on the y axis is constant at the negative angles and relatively low, increases with a step at approximately 0° and is also constant at angles above that, but at a higher level. The diagrams reproduced in FIGS. 3 and 4 correspond to a field on which plants stand only in the region above the angle of 0°,—that is, to the right of the longitudinal centerline of the harvesting machine 10—since there the distance "d" to the scanning laser device 42 is smaller. In areas in which plants stand the reflectivity is higher than on the open ground, since the scanning laser device operates with infra-red radiation that is reflected to a greater degree by the plants 62 than by the ground. The edge of the stand of the crop is located at a pivot angle of 0°.

FIG. 5 shows a flow chart according to which the controller 44 operates. After the start in step 100, in step 102 the control arrangement 43 is instructed to begin operation of the pivoting motor 54 so that the scanning laser device 42 scans a certain region of angles step by step ahead of the harvesting machine 10. At that time the immediate pivoting angles, distance measurement values and intensity measurement values are stored in memory and transmitted to the controller 44 in step 104.

In step 106 the amount of the plants 62 standing on the field is calculated on the basis of the measured values. Here the contour of the plants 62 is initially determined from the distance measurement values, that is, with consideration of the geometry of the entire measurement arrangement including its attachment to the harvesting machine 10, the vertical cross section area (that is, the contour) of the standing front of the plants 62 is determined. This calculation can be performed as described in U.S. Pat. No. 6,095,254, which is incorporated herein by reference.

On the basis of the measured intensity a consideration of the density of the crop material follows in step 108, that can be determined from the intensity measured in the crop material and the intensity upon clearing the ground (or the difference of the two intensities). The amount can then be determined from the width and the height or the cross sectional area and the density of the plants (by integration of the density over the area). The amount that is to be associated with a run through of the scanning laser device 42 over the range of angles is stored in memory in step 110, where information about the point in time and/or the position, at which the measurement is taken is stored in memory along with the amount. The point in time can be determined with an appropriate clock, the position with a position determination system such as the appropriate GPS reference system.

In step 112 the throughput of the harvesting machine 10 is measured with the crop throughput sensor 48 and the velocity sensor 49. The throughput is a function of the known width of the feeder house 38, the pressures of the mass of the crop measured in the crop throughput sensor 48 and the conveying velocity of the feeder house 38, that is measured with the velocity sensor 49. The throughput (volume per unit of time) is determined from the measured values of the aforementioned sensors.

In step 114 the throughput determined in step 112 in the harvesting machine is compared with a theoretical throughput. The theoretical throughput is calculated on the basis of the amount that was stored in step 110 and the forward velocity of the harvesting machine 10, there the values stored in memory are used, that correspond to the point in time or the position at which the plants 62 stand whose throughput was measured in step 112 in the harvesting machine 10. In case the comparison in step 114 does not result in an agreement between the two values (or at least approximate agreement), step 116 follows, in which an error message is transmitted. On the basis of the error message the operator can recognize that a verification of the scanning laser device 42 is required. Then a manual repositioning of the forward propulsion velocity and the remaining parameters is also useful which can otherwise be adjusted automatically.

If the values agree, step 118 follows, in which the controller 44 adjusts the forward propulsion velocity of the harvesting machine 10 by means of the variable speed transmission 64 to a value that corresponds to an optimum loading of the harvesting machine 10 on the basis of the amount values stored in memory in step 110. Here the time interval is considered until the harvesting machine 10 reaches the location at which the plants 62 stand that correspond to the measured amount value. In addition the rotational speed of the threshing cylinder is adjusted through the controller by means of the drive 46 to correspond to a value measured in step 110 and the moisture measured by the moisture sensor 50.

Step 118 is again followed by step 102. In this way a series of measured values of the amount is continuously generated that are used with consideration of the forward velocity of the harvesting machine with the appropriate time delay for the control of the forward velocity control.

Having described the preferred embodiment, it will become apparent that various modifications can be made without departing from the scope of the invention as defined in the accompanying claims.

What is claimed is:

1. A system for measuring the amount of crop material to be harvested that is located on a field, the system comprising a scanning device having a transmitter that emits electromagnetic radiation on the crop material located on the field and a receiver for receiving reflected electromagnetic radiation emitted by the transmitter from the crop material located on the field, the receiver determines the location of the reflected electromagnetic radiation received by the receiver and the intensity of the reflected electromagnetic radiation, and a controller in communication with the scanning device, the controller determines the amount of crop material to be harvested located on the field from the location of the reflected electromagnetic radiation received by the receiver and the intensity of the reflected electromagnetic radiation received by the receiver.

2. A system as defined by claim 1 wherein the receiver transmits crop material location signals to the controller which contains information about the distance of the crop material located on the field from the receiver, the controller uses the crop material location signals to determine the amount of crop material to be harvested.

3. A system as defined by claim 1 wherein the receiver transmits crop material location signals to the controller which contains information about the distance of the crop material located on the field from the transmitter, the controller uses the crop material location signals to determine the amount of crop material to be harvested.

4. A system as defined by claim 1 wherein the receiver transmits crop material location signals to the controller which contains information about the distance of the crop material located on the field from the transmitter and the receiver, the controller uses the crop material location signals to determine the amount of crop material to be harvested.

5. A system as defined by claim 1 wherein the controller is in communication with a moisture sensor that is arranged to measure the moisture of the crop material.

6. A system as defined by claim 5 wherein the crop material located on the field has a mass and the controller calculates the mass of the crop material to be harvested.

7. A system as defined by claim 6 wherein the mass of the crop material to be harvested is corrected on the basis of a cutting height of a harvesting machine.

8. A system as defined by claim 1 wherein the controller is in communication with a crop throughput sensor, that is arranged to measure crop throughput of a harvesting machine.

9. A system as defined by claim 8 wherein the controller compares crop throughput of the crop throughput sensor with a value calculated from the crop material location and intensity signals of the receiver.

10. A system as defined by claim 9 wherein the controller calculates and uses a time delay for the location of crop material located on the field as signaled from the receiver and crop throughput measured by the crop throughput sensor.

11. A system as defined by claim 10 wherein the controller uses the crop throughput measured by the crop throughput sensor for the calibrating mass of the crop material to be harvested calculated from the plant material location and intensity signals of the receiver.

12. A system as defined by claim 11 wherein the controller that is connected with a steering arrangement for the harvesting machine.

13. A system as defined by claim 12 wherein the controller is in communication with a variable speed transmission used to propel the harvesting machine.

14. A system as defined by claim 12 wherein the controller is in communication with a device for adjusting a crop processing assembly on the harvesting machine.

15. A system as defined by claim 12 wherein the controller is in communication with a recording device for recording of the amount and location of crop material located on the field.

16. A system for measuring the amount of crop material located on a field to be harvested, the system comprising a scanning device having a transmitter that emits electromagnetic radiation on the crop material located on the field and a receiver for receiving reflected electromagnetic radiation emitted by the transmitter from the plants standing in the field, the receiver determines the angle of the reflected electromagnetic radiation received by the receiver and the intensity of the reflected electromagnetic radiation, and a controller is in communication with the scanning device, the controller determines the amount of crop material located on the field from the angle of the reflected electromagnetic radiation received by the receiver and the intensity of the reflected electromagnetic radiation received by the receiver.

17. A harvesting machine comprising:

a supporting structure;

ground supporting wheels;

a harvesting assembly mounted to the supporting structure for harvesting crop material;

a scanning device having a transmitter that emits electromagnetic radiation and onto crop material located in front of the harvesting machine and a receiver for receiving reflected electromagnetic radiation reflected back from the crop material, the receiver generates crop location signals and intensity signals from the reflected electromagnetic radiation, the scanning device is mounted to the supporting structure;

a controller is in communication with the scanning device, the controller determines the amount of crop material located in front of the harvesting machine from the crop material location signals generated by the receiver and the intensity signals generated by the receiver.

18. A harvesting machine as defined by claim 17 wherein the controller is in communication with a crop throughput sensor, that is arranged to measure crop throughput through the harvesting machine.

19. A harvesting machine as defined by claim 18 wherein the controller compares crop throughput of the crop throughput sensor with the amount of crop material calculated by the controller in response to the crop material location and intensity signals of the receiver.

20. A harvesting machine as defined by claim 19 wherein the controller calculates and uses a time delay for the location of crop material located in front of the harvesting machine as signaled from the receiver and crop throughput measured by the crop throughput sensor.

\* \* \* \* \*